(12) United States Patent
Cohen

(10) Patent No.: US 6,295,533 B2
(45) Date of Patent: *Sep. 25, 2001

(54) SYSTEM AND METHOD FOR ACCESSING HETEROGENEOUS DATABASES

(75) Inventor: William W. Cohen, North Plainfield, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,471

(22) Filed: Feb. 24, 1998

Related U.S. Application Data

(60) Provisional application No. 60/039,576, filed on Feb. 25, 1997.

(51) Int. Cl.[7] ........................................... G06F 17/30
(52) U.S. Cl. ........................................ 707/5; 704/9
(58) Field of Search .................. 707/3–7; 704/9–10, 704/240

(56) References Cited

U.S. PATENT DOCUMENTS

| | | | |
|---|---|---|---|
| 5,237,678 | * 8/1993 | Kuechler et al. | 707/5 |
| 5,454,106 | * 9/1995 | Burns et al. | 707/4 |
| 5,577,241 | * 11/1996 | Spencer | 707/5 |
| 5,694,559 | 12/1997 | Hobson et al. | |
| 5,701,400 | 12/1997 | Amado et al. | |
| 5,701,453 | * 12/1997 | Maloney et al. | 707/2 |
| 5,819,291 | * 10/1998 | Haimowitz et al. | 707/201 |
| 5,884,304 | * 3/1999 | Davis, III et al. | 707/4 |
| 5,895,465 | * 4/1999 | Guha | 707/4 |
| 5,920,859 | * 7/1999 | Li | 707/5 |
| 5,924,090 | * 7/1999 | Krellenstein | 707/5 |
| 5,960,430 | * 9/1999 | Haimowitz et al. | 707/6 |
| 5,999,928 | * 12/1999 | Yan | 707/6 |

OTHER PUBLICATIONS

International Search Report dated Oct. 29, 1998, for International Application No. PCT/US98/03627 filed Feb. 25, 1998.

"Heuristic Joins to Integrate Structured Heterogeneous Data"; Scott B. Huffman and David Steier; Price Waterhouse Technology Centre, Menlo Park, California, (1995).

"The Identification and Resolution of Semantic Heterogeneity in Multidatabase Systems"; Douglas Fang, Joachim Hammer and Dennis McLeod; Computer Science Department, University of Southern California, Proc. First International Workshop on Interoperability in Multidatabase Systems, 1991, pp. 52–59.

(List continued on next page.)

Primary Examiner—Hosain T. Alam
Assistant Examiner—Jean Bolte Fleurantin
(74) Attorney, Agent, or Firm—Kenyon & Kenyon

(57) ABSTRACT

A system and method are provided for answering queries concerning information stored in a set of collections. Each collection includes a structured entity, and each structured entity includes a field. A query is received that specifies a subset of the set of collections and a logical constraint between fields that includes a requirement that a first field match a second field. The probability that the first field matches the second field is determined automatically based upon the contents of the fields. A collection of lists is generated in response to the query, where each list includes members of the subset of collections specified in the query, and where each list has an estimate of the probability that the members of the list satisfies the logical constraint specified in the query.

28 Claims, 3 Drawing Sheets

| #TUPLES | SCHEMA AND SOURCE | |
|---|---|---|
| 31,281 | IMDB (movieName,year)<br>http://us.imdb.com | 303 |
| 37,572 | VideoFlicks (movieName,year genre)<br>http://www.videoflicks.com | 304 |
| 232 | Review (movieName,newspaper,review)<br>http://www.cinema.pgh.pa.us/movie/reviews | 305 |
| 78 | MovieLink (movieName,cinemaName, address,phone, zipcode)<br>http://www.movielink.com | 306 |
| 1,163 | HooversWeb (companyName,industry,website)<br>http://www.hoovers.com | 301 |
| 976 | Iontech (companyName,website,tickertape,industry)<br>http://www.iontech.com | 302 |
| 990 | Animal 1 (commonName,scientificName)<br>http://endeavor.des.ucdavis.edu/nps | 307 |
| 4,719 | Animal 2 (commonName,scientificName,Range)<br>http://www.nceet.snre.umich.edu/EndSpp/ES.lists.html | 308 |

OTHER PUBLICATIONS

"The Field Marching Problem: Algorithms and Applications"; Alvaro E. Monge and Charles P. Elkan; Department of Computer Science and Engineering, University of California, San Diego, (1996).

"The Merge/Purge Problem for Large Databases"; Mauricio A. Hernandez and Salvatore J. Stolfo; Department of Computer Science, Columbia University, (1995).

"Probabilistic Datalog—A Logic for Powerful Retrieval Methods"; Norbert Fuhr, University of Dortmund, Germany, (1995).

"An Efficient Domain–Independent Algorithm for Detecting Approximately Duplicate Database Records"; Alvaro E. Monge and Charles P. Elkan; Department of Computer Science and Engineering, University of California, San Diego, pp. 383–394 (1997).

"Query Evaluation: Strategies and Optimizations"; Howard Turtle; Information Processing & Management, Nov. 1995, pp. 831–850.

* cited by examiner

*FIG. 1*
PRIOR ART

RELATION Q

| TIME | CHANNEL | MOVIE NAME | MOVIE ID |
|---|---|---|---|
| 12:30am WED | 11 | QUEEN OF OUTER SPACE (ZSA ZSA GABOR) | 137 |
| 1:00am WED | 43 | ELEPHANT MAN (A. HOPKINS) | 1099 |
| 1:00am THURS | 24 | SPACE BALLS (MEL BROOKS) | 102 |
| ⋮ | ⋮ | ⋮ | ⋮ |

RELATION R

| MOVIE ID | REVIEW |
|---|---|
| 137 | QUEEN OF OUTER SPACE (*) <br> AN EMBARRASSINGLY BAD ACCOUNT OF ... |
| 2017 | RUNNING SCARED (***) <br> BILLY CRYSTAL SHINES IN THIS FAST-PACED... |
| 102 | SPACE BALLS (*1/2) <br> WHILE NOT ONE OF MEL BROOKS' BETTER EFFORTS, THIS STAR WARS SPOOF... |
| ⋮ | ⋮ |

JOIN OF Q AND R

| TIME | CHANNEL | MOVIE NAME | MOVIE ID | REVIEW |
|---|---|---|---|---|
| 12:30am WED | 11 | QUEEN OF OUTER SPACE (ZSA ZSA GABOR) | 137 | QUEEN OF OUTER SPACE (*) <br> AN EMBARRASSINGLY BAD ACCOUNT OF ... |
| 1:00am THURS | 24 | SPACE BALLS (MEL BROOKS) | 102 | SPACE BALLS (*1/2) <br> WHILE NOT ONE OF MEL BROOKS' BETTER EFFORTS, THIS STAR WARS SPOOF... |
| ⋮ | ⋮ | ⋮ | ⋮ | ⋮ |

FIG. 3

| #TUPLES | SCHEMA AND SOURCE | |
|---|---|---|
| 31,281 | IMDB (movieName,year)<br>http://us.imdb.com | 303 |
| 37,572 | VideoFlicks (movieName,year genre)<br>http://www.videoflicks.com | 304 |
| 232 | Review (movieName,newspaper,review)<br>http://www.cinema.pgh.pa.us/movie/reviews | 305 |
| 78 | MovieLink (movieName,cinemaName, address,phone, zipcode)<br>http://www.movielink.com | 306 |
| 1,163 | HooversWeb (companyName,industry,website)<br>http://www.hoovers.com | 301 |
| 976 | Iontech (companyName,website,tickertape,industry)<br>http://www.iontech.com | 302 |
| 990 | Animal 1 (commonName,scientificName)<br>http://endeavor.des.ucdavis.edu/nps | 307 |
| 4,719 | Animal 2 (commonName,scientificName,Range)<br>http://www.nceet.snre.umich.edu/EndSpp/ES.lists.html | 308 |

SYSTEM AND METHOD FOR ACCESSING HETEROGENEOUS DATABASES

CROSS-REFERENCES TO RELATED APPLICATIONS

This application claims the benefit of U.S. Provisional Application Ser. No. 60/039,576 filed Feb. 25, 1997.

FIELD OF THE INVENTION

This invention relates to accessing databases, and particularly to accessing heterogeneous relational databases.

BACKGROUND OF THE INVENTION

Databases are the principal way in which information is stored. The most commonly used type of database is a relational database, in which information is stored in tables called relations. Relational databases are described in *A First Course on Database Systems* by Ullman and Widom, Prentice Hall, 1997, and in *An Introduction to Database Systems*, by C. J. Date, Addison Wesley, 1995.

Each entry in a relation is typically a character string or a number. Generally relations are thought of as sets of tuples, a tuple corresponding to a single row in the table. The columns of a relation are called fields.

Commonly supported operations on relations include selection and join. Selection is the extraction of tuples that meet certain conditions. Two relations are joined on fields F1 and F2 by first taking their Cartesian product (the Cartesian product of two relations A and B is the set of all tuples $a_1, \ldots, a_m, b_1, \ldots, b_n$, where $a_1, \ldots, a_m$ is a tuple from A, and $b_1, \ldots, b_n$ is a tuple from B) and then selecting all tuples such that F1=F2. This leads to a relation with two equivalent fields, so usually one of these is discarded.

Joining relations is the principal means of aggregating information that is spread across several relations. For example, FIG. 1 shows two sample relations Q 101 and R 102, and the result of joining Q and R (the "Join" of Q and R) 103 on the fields named MovieID (the columns indicated by 104.) For reasons of efficiency, relations are usually joined on special fields that have been designated as keys, and database management systems are implemented so as to efficiently perform joins on fields that are keys.

In most databases, each tuple corresponds to an assertion about the world. For instance, the tuple<12:30, 11, "Queen of Outer Space (Zsa Zsa Gabor)", 137>(the row indicated by 105) in the relation Q 101 of FIG. 1 corresponds to the assertion "the movie named 'Queen of Outer Space', starring Zsa Zsa Gabor, will be shown at 12:30 on channel 11."

Known systems can represent information that is uncertain in a database. One known method associates every tuple in the database with a real number indicating the probability that the corresponding assertion about the world is true. For instance, the tuple described above might be associated with the probability 0.9 if the preceding program was a major sporting event, such as the World Series. The uncertainty represented in this probability includes the possibility, for example, that the World Series program may extend beyond its designated time slot. Extensions to the database operations of join and selection useful for relations with uncertain information are also known. One method for representing uncertain information in a database is described in *Probabilistic Datalog—a Logic for Powerful Retrieval Methods*" by Norbert Fuhr, in Proceedings of the 1995 ACM SIGIR Conference on Research in Information Retrieval, pages 282–290, New York, 1995. Other methods are surveyed in *Uncertainty Management in Information Systems*, edited by Motro and Smets, Kluwer Academic Publishers, 1997. Database systems that have been extended in this way are called probabilistic databases.

Another way of storing information is with a text database. Here information is stored as a collection of documents, also known as a corpus. Each document is simply a textual document, typically in English or some other human language. One standard method for representing text in such a database so that it can be easily accessed by a computer is to represent each document as a so-called document vector. A document vector representation of a document is a vector with one component for each term appearing in the corpus. A term is typically a single word, a prefix of a word, or a phrase containing a small number of words or prefixes. The value of the component corresponding to a term is zero if that term does not appear in the document, and non-zero otherwise.

Generally the non-zero values are chosen so that words that are likely to be important have larger weights. For instance, word that occur many times is a document, or words that are rare in the corpus, have large weights. A similarity function can then be defined for document vectors, such that documents with the similar term weights have high similarities, and documents with different term weights have low similarity. Such a similarity function is called a term-based similarity metric.

An operation commonly supported by such text databases is called ranked retrieval. The user enters a query, which is a textual description of the documents he or she desires to be retrieved. This query is then converted into a document vector. The database system then presents to the user a list of documents in the database, ordered (for example) by decreasing similarity to the document vector that corresponds to the query.

As an example, the Review column (the column indicated by 107) of relation R 102 in FIG. 1 might be instead stored in a text database. The answer to the user query "embarrassingly bad science fiction" might be a list containing the review of "Queen of Outer Space" as its first element, and the review of "Space Balls" as its second element.

In general, the user will only be interested in seeing a small number of the documents that are highly similar. Techniques are known for efficiently generating a reduced list of documents, say of size K, that contains all or most of the K documents that are most similar to the query vector, without generating as an intermediate result a list of all documents that have non-zero similarity to the query. Such techniques are described in Chapters 8 and 9 of *Automatic Text Processing*, edited by Gerard Salton, Addison Wesley, Reading, Mass., 1989, and in *Query Evaluation: Strategies and Optimizations* by Howard Turtle and James Flood in *Information Processing and Management*, 31(6):831–850, November 1995.

In some relational database management systems (RDBMS) relations are stored in a distributed fashion, i.e., different relations are stored on different computers. One issue which arises in distributed databases pertains to joining relations stored at different sites. In order for this join to be performed, it is necessary for the two relations to use comparable keys. For instance, consider two relations M and E, where each tuple in M encodes a single person's medical history, and each tuple in E encodes data pertaining to a single employee of some large company. Joining these relations is feasible if M and E both use social security numbers as keys. However, if E uses some entirely different identifier (say an employee number), then the join cannot be carried out, and there is no known way of aligning the tuples in E with those in M. To take another example, the relations Q 101 and R 102 of FIG. 1 could not be joined unless they both contained a similar field, such as the MovieID field (column 104.)

In practice, the presence of incomparable key fields is often a problem in merging relations that are maintained by different organizations. A collection of relations that are maintained separately are called heterogeneous. The problem of providing access to a collection of heterogeneous relations is called data integration. The process of finding pairs of keys that are likely to be equivalent key matching is called key matching.

Techniques are known for coping with some sorts of key mismatches that arise in accessing heterogeneous databases. One technique is to normalize the keys. For instance, in the relations Q 101 and R 102 in FIG. 1, suppose that numeric MovieID's are not available, and it is desirable to join Q 101 and R 102 on strings that contain the name of the movie, specifically, the MovieName field (the column indicated by 106) of Q 101, and the underlined section of the Review field (the column indicated by 107) of R 102. One might normalize these strings by removing all parenthesized text (which contains actor's names in Q 101, and a rating in R 102). A data integration system based on normalization of keys is described in *Querying Heterogeneous Information Sources Using Source Descriptions*, by Alon Y. Levy, Anand Rajaraman, and Joann J. Ordille, in {Proceedings of the 22nd International Conference on Very Large Databases (VLDB-96)}, Bombay, India, September 1996.

Another known technique for handling key mismatches is to use an equality predicate, a function which, when called with arguments Key1 and Key2, indicates if Key1 and Key2 should be considered equivalent for the purpose of a join. Generally such a function is of limited applicability because it is appropriate only for a small number of pairs of columns in a specific database. The use of equality tests is described in the *Identification and Resolution of Semantic Heterogeneity in Multidatabase Systems*, by Douglas Fang, Joachim Hammer, and Dennis McLeod, in *Multidatabase Systems: An Advanced Solution for Global Information Sharing*, pages 52–60. IEEE Computer Society Press, Los Alamitos, Calif., 1994. Both normalization and equality predicates are potentially expensive in terms of human effort: for every new type of key field, a new equality predicate or normalization procedure must be written by a human programmer.

It is often the case that the keys to be matched are strings that name certain real-world entities. (In our example, for instance, they are the names of movies.) Techniques are known for examining pairs of names and assessing the probability that they refer to the same entity. Once this has been done, then a human can make a decision about what pairs of names should be considered equal for all subsequent queries that require key matching. Such techniques are described in *Record Linkage Techniques*—1985, edited by B. Kilss and W. Alvey, Statistics of Income Division, Internal Revenue Service Publication 1299-2-96, available from {http://www.bts.gov/fcsm/methodology/}, 1985, as well as in *the Merge/purge Problem for Large Databases*, by M. Hernandez and S. Stolfo, in Proceedings of the 1995 ACM SIGMOD, May 1995, and *Heuristic Joins to Integrate Structured Heterogeneous Data*, by Scott Huffman and David Steier, in Working Notes of the AAAI Spring Symposium on Information Gathering In Heterogeneous Distributed Environments, Palo Alto, Calif., March 1995, AAAI Press.

Many of these techniques require information about the types of objects that are being named. For instance, Soundex is often used to match surnames. An exception to this is the use of the Smith-Waterman edit distance, which provides a general similarity metric for any pairs of strings. The use of the Smith-Waterman edit distance metric key matching is described in an *Efficient Domain—independent Algorithm for Detecting Approximately Duplicate Database Records* by A. Monge and C. Elkan, in The proceedings of the SIGMOD 1997 Workshop on Data Mining and Knowledge Discovery, May 1997.

It is also known how to use term-based similarity functions, closely related to IR similarity metrics, for key matching. Use of term-based similarity metrics for key matching, as an alternative to Smith-Waterman, is described in *the Field-matching Problem: Algorithm and Applications* by A. Monge and C. Elkan in Proceedings of the Second International Conference on Knowledge Discovery and Data Mining, August 1996.

In summary, known methods require that data from heterogeneous sources be preprocessed in some manner. In particular, the data fields that will be used as keys must be normalized, using a domain-specific procedure, or a domain-specific equality test must be written, or a determination as to which keys are in fact matches must be made by a user, perhaps guided by some previously computed assessment of the probability that each pair of keys matches.

All of these known procedures are require human intervention, potentially for each pair of data sources. Furthermore, all of these procedures are prone to error. Errors in the process of determining which keys match will lead to incorrect answers to queries to the resulting database.

What is needed is a way of accessing data from many heterogeneous sources without any preprocessing steps that must be guided by a human. Furthermore, when pairs of keys from different sources are assumed to match, the end user should be alerted to these assumptions, and provided with some estimate of the likelihood that the assumptions are correct, or other information with which the end user can assess the quality of the result.

SUMMARY OF THE INVENTION

An embodiment of the present invention accesses information stored in heterogeneous databases by using probabilistic database analysis techniques to answer database queries. The embodiment uses uncertain information about possible key matches obtained by using general-purpose similarity metrics to assess the probability that pairs of keys from different databases match. This advantageously allows a user to access heterogeneous sources of information without requiring any preprocessing steps that must be guided by a human. Furthermore, when pairs of keys from different sources are assumed to match, the user is apprised of these assumptions, and provided with some estimate of the likelihood that the assumptions are correct. This likelihood information can help the user to assess the quality of the answer to the user's query.

Data from heterogeneous databases is collected and stored in relations. In one embodiment, the data items in these relations that will be used as keys are represented as text. A query is received by a database system. This query can pertain to any subset of the relations collected from the heterogeneous databases mentioned above. The query may also specify data items from these relations that must or should refer to the same entity.

A set of answer tuples is computed by the database system. These tuples are those that are determined in accordance with the present invention to most likely to satisfy the user's query. A tuple is viewed as likely to satisfy the query if those data items that should refer to the same entity (according to the query) are judged to have a high probability of referring to the same entity. The probability that two data items refer to the same entity is determined using problem-independent similarity metrics that advantageously do not require active human intervention to formulate for any particular problem.

In computing the join of two relations, each of size N, $N^2$ pairs of keys must be considered. Hence, for moderately large N, it is impractical to compute a similarity metric (and store the result) for each pair. An embodiment of the present invention advantageously solves this problem by computing similarities between pairs of keys at the time a query is considered, and computing similarities between only those pairs of keys that likely to be highly similar.

In some cases, many pairs of keys will be weakly similar, and hence will have some small probability of referring to the same entity. Thus, the answer to a query could consist of a small number of tuples with a high probability of being correct answers, and a huge number of tuples with a small but non-zero probability of being correct answers. Known probabilistic database methods would disadvantageously generate all answer tuples with non-zero probability, which often would be an impractically large set. The present invention advantageously solves this problem by computing and returning to the user only a relatively small set of tuples that are most likely to be correct answers, rather than all tuples that could possibly be correct answers.

In one embodiment of the present invention, the answer tuples are returned to the user in the order of their computed likelihood of being correct answers, i.e., the tuples judged to be most likely to be correct are presented first, and the tuples judged less likely to be correct are presented later.

In accordance with one embodiment of the present invention, queries concerning information stored in a set of collections are answered. Each collection includes a structured entity. Each structured entity in turn includes a field.

In accordance with an embodiment of the present invention, a query is received that specifies a subset of the set of collections and a logical constraint between fields that includes a requirement that a first field match a second field. The probability that the first field matches the second field based upon the contents of the fields is automatically determined. A collections of lists is generated in response to the query, where each list includes members of the subset of collections specified in the query. Each list also has an estimate of the probability that the members of the list satisfies the logical constraint specified in the query.

The present invention advantageously combines probabilistic database techniques with probabilistic assessments of similarity to provide a means for automatically and efficiently accessing heterogeneous data sources without the need for human intervention in identifying similar keys.

BRIEF DESCRIPTION OF THE DRAWINGS

FIG. 1 shows an prior art example of two relations Q and R and a join of relations Q and R.

FIG. 3 shows a table of relations upon which experiments were performed to determine properties of the present invention.

DETAILED DESCRIPTION

Figure 2:
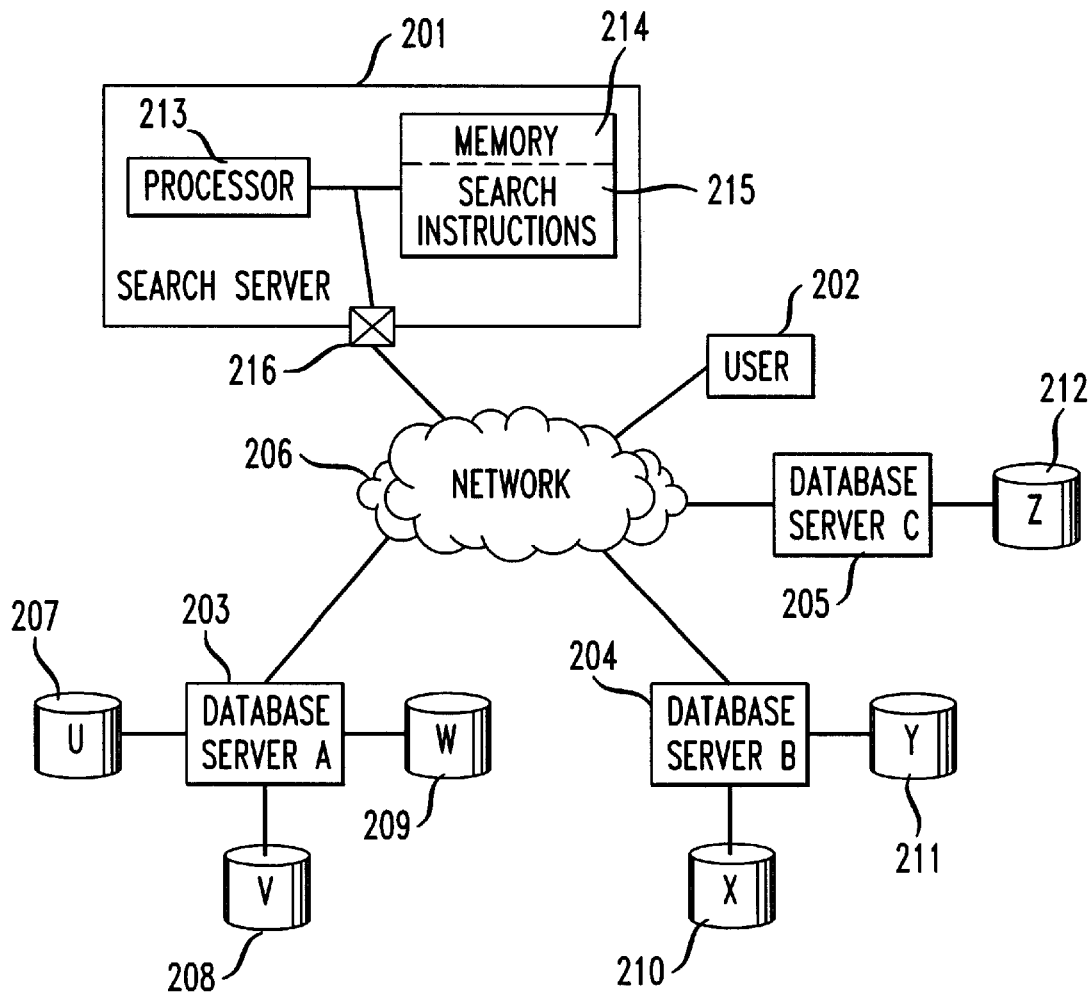
FIG. 2 shows an embodiment of a system and apparatus in accordance with the present invention.

An embodiment of an apparatus and system in accordance with the present invention is shown in FIG. 2. A search server 201, user 202, and database server A 203, database server B 204 and database server C 205 are coupled to network 206. Heterogeneous databases U 207, V 208 and W 209 are coupled to database server A 203. Heterogeneous databases X 210 and Y 211 are coupled to database server B 204. Heterogeneous database Z 212 is coupled to database server C 213. User 202 submits a query to search server 101. Search server 101 conducts a search of heterogeneous databases U 207, V 208, W 209, X 210, Y 211 and Z 212 in an automatic fashion in accordance with the method of the present invention.

As shown in FIG. 2, search server 201 includes processor 213 and memory 214 that stores search instructions 215 adapted to be executed on processor 213. In one embodiment of the present invention, processor 213 is a general purpose microprocessor, such as the Pentium II processor manufactured by the Intel Corporation of Santa Clara, Calif. In another embodiment, processor 213 is an Application Specific Integrated Circuit (ASIC) that embodies at least part of the search instructions 215, while the rest are stored at memory 214. In various embodiments of the present invention, memory 214 is a hard disk, read-only memory (ROM), random access memory (RAM), flash memory, or any combination thereof. Memory 214 is meant to encompass any medium capable of storing digital data. As shown in FIG. 2, memory 214 is coupled to processor 213.

One embodiment of the present invention is a medium that stores search instructions. As used herein, the phrase "adapted to be executed" is meant to encompass instructions stored in a compressed and/or encrypted format, as well as instructions that have to be compiled or installed by an installer before being executed by processor 213.

In one embodiment, the search server further comprises a port 216 adapted to be coupled to a network 206. The port is coupled to memory 214 and processor 213.

In one embodiment, network 206 is the Internet. In another embodiment, it is a Local Area Network (LAN). In yet another embodiment, it is a Wide Area Network (WAN). In accordance with the present invention, network 206 is meant to encompass any switched means by which one computer communicates with another.

In one embodiment, the user is a personal computer. In one embodiment, database servers A 203, B 204 and C 205 are computers adapted to act as interfaces between a network 206 and databases. In one embodiment the database servers 203, 204 and 205 are server computers. In another embodiment, they act as peer computers.

As discussed above, many databases contain many fields in which the individual constants correspond to entities in the real world. Examples of such name domains include course numbers, personal names, company names, movie names, and place names. In general, the mapping from name constants to real entities can differ in subtle ways from database to database, making it difficult to determine if two constants are co-referent ({i.e.}, refer to the same entity).

For instance, in two Web databases listing educational software companies, one finds the name constants "Microsoft" and "Microsoft Kids". Do these denote the same company, or not? In another pair of Web sources, the names "Kestrel" and "American Kestrel" appear. Likewise, it is unclear as to whether these denote the same type of bird. Other examples of this problem include "MIT" and "MIT Media Labs"; and "A&T Bell Labs", "AT&T Labs", "AT&T Labs-Research", "AT&T Research", "Bell Labs", and "Bell Telephone Labs."

As can be seen from the above examples, determining if two name constants are co-referent is far from trivial in many real-world data sources. Frequently it requires detailed knowledge of the world, the purpose of the user's query, or both. These generally necessitate human intervention in preprocessing or otherwise handling a user query.

Unfortunately, answering most database queries require understanding which names in a database are coreferent. Two phrases are coreferent if each refers to the same or approximately the same external entity. An external entity is an entity in the real world to which a phrase refers. For example, Microsoft and Microsoft, Inc. are two phrases that are coreferent in the sense that they refer to the same company. As used herein, the term "phrase" means any fragment of text down to a single character, e.g., a word, a collection of words, a letter, several letters, a number, a punctuation mark or set of punctuation marks, etc.

This requirement of understanding which names in a database are coreferent poses certain problems. For example, to join two databases on Company_name fields, where the values of the company names are Microsoft and Microsoft Kids, one must know in advance if these two names are meant to refer to the same company. This suggests extending database systems to represent the names explicitly so as to compute the probability that two names are coreferent. This in turn requires that the database includes an appropriate way of representing text (phrases).

One widely used method for representing text briefly described above is the vector space model. Assume a vocabulary T of terms, each which will be treated as atomic, i.e., unbreakable. Terms can include words, phrases, or word stems, which are morphologically derived word prefixes. A fragment of text is represented as DocumentVector, which is a vector of real numbers $v \in R^{|T|}$, each component of which corresponds to a term $t \in T$. The component of v which corresponds to $t \in T$ is denoted $v^t$.

A number of schemes have been proposed for assigning weights to terms, as discussed above. An embodiment of the present invention uses the TF-IDF weighting scheme with unit length normalization. Assuming that the document represented by v is a member of a document collection C, define $\hat{v}^t$ to have the value zero if t is not present in the document represented by v, and otherwise the value $\hat{v}^t = (\log(TF_{v,t})+1) \cdot \log(IDF_t)$, where the "term frequency" is the number of times that term t occurs in the document represented by v, and the inverse document frequency $IDF_t$ is $$\frac{|C|}{|C_t|},$$

where $C_t$ is the subset of documents in C that contain the term t. This vector is then normalized to unit length, leading to the following weight for $v^t$:

$$v^t = \frac{\hat{v}^t}{\sqrt{\sum_{t \in T} (\hat{v}^t)^2}}$$

The "similarity" of two document vectors v and w is given by the formula: $sim(v, w) = \sum_{t \in T} v^t \cdot w^t$, which is usually interpreted as the cosine of the angle between v and w. Since every document vector v has unit length, sim (v, w) is always between zero and one.

Although these vectors are conceptually very long, they are also very sparse: if a document contains only k terms, then all but k components of its vector representation will have zero weight. Methods for efficiently manipulating these sparse vectors are known. The vector space representation for documents is described in *Automatic Text Processing*, edited by Gerard Salton, Addison Welsley, Reading, Mass., 1989.

The general idea behind this scheme is that the magnitude of the component $v^t$ is related to the "importance" of the term t in the document represented by v. In accordance with the present invention, two documents are similar when they share many "important" terms. The TF-IDF weighting scheme assigns higher weights to terms that occur infrequently in the collection C. The weighting scheme also gives higher weights to terms that occur frequently in a document. However, in this context, this heuristic is probably not that important, since names are usually short enough so that each term occurs only once. In a collection of company names, for instance, common terms like "Inc." and "Ltd." would have low weights. Uniquely appearing terms like "Lucent" and "Microsoft" would have high weights. And terms of intermediate frequency like Acme and American would have intermediate weights.

The present invention operates on data is stored in relations, where the primitive elements of each relation are document vectors, rather than atoms. This data model is called STIR, which stands for Simple Texts In Relations. The term "simple" indicates that no additional structure is assumed for the texts.

More precisely, an extensional database (EDB) consists of a term vocabulary T and set of relations $\{p_1, \ldots, p_n\}$. Associated with each relation p is a set of tuples called tuples(p). Every tuple $(v_1, \ldots, v_k) \in$ tuples (p) has exactly k components, and each of these components $v_i$ is a document vector. It is also assumed that a score is associated with every tuple in p. This score will always be between zero and one, and will be denoted score $((v_1, \ldots, v_k) \in$ tuples (p)). In most applications, the score of every tuple in a base relation will be one; however, in certain embodiments, non-unit scores can occur. This allows materialized views to be stored.

An embodiment of a language for accessing these relations in accordance with the present invention is called WHIRL, which stands for Word-based Heterogeneous Information Retrieval Logic. A conjunctive WHIRL query is written $B_1 \wedge \ldots \wedge B_k$, where each $B_i$ is a literal. There are two types of literals. An EDB literal is written $p(X_1, \ldots, X_k)$ where p is the name of an EDB relation, and the $X_i$'s are variables. A similarity literal is written X~Y, where X and Y are variables. Intuitively, this can be interpreted as a requirement that documents X and Y be similar. If X appears in a similarity literal in a query Q, then X also appears in some EDB literal in Q.

To take another example, consider two relations R and S, where tuples of R contain a company name and a brief description of the industry associated with that company, and tuples of S contain a company name and the location of the World Wide Web homepage for that company. The join of the relations R and S might be approximated by the query:

$Q_1$: r (Company1, Industry) ∧ s (Company2,WebSite)

∧ Company1~Company2

This is different from an equijoin of R and S, which could be written:

r(Company,Industry) ∧ s(Company,WebSite).

To find Web sites for companies in the telecommunications industry one might use the query:

$Q_2$: r(Company1,Industry) ∧ s(Company2,WebSite)

∧ Company1~Company2 ∧ const1(I0)

∧ Industry~I0 where the relation {const1} contains a single document describing the industry of interest, such as "telecommunications equipment and/or services".

The semantics of WHIRL are defined in part by extending the notion of score to single literals, and then to conjunctions. The semantics of WHIRL are best described in terms of substitutions. A substitution θ is a mapping from variables to document vectors. A substitution is denoted as θ={$X_i=v_i$, . . . , $X_n=v_n$}, where each $X_i$ is mapped to the vector $v_i$. The variables $X_i$ in the substitution are said to be "bound" by θ. If Q is a WHIRL query (or a literal or variable) then Qθ denotes the result of applying that mapping to Q, i.e., the result of taking Q and replacing every variable $X_i$ appearing in Q with the corresponding document vector $v_i$. A substitution θ is "ground for Q" if Qθ contains no variables.

Suppose B is a literal, and θ is a substitution such that Bθ is ground. If B is an EDB literal $p(X_1, \ldots, X_k)$, then score(Bθ)=score(($X_1θ, \ldots, X_kθ$) ∈p) if ($X_1θ, \ldots, X_kθ$) ∈ in tuples(p), and score(Bθ)=0 otherwise. If B is a similarity literal X~Y, then score (Bθ)=sim(Xθ, Yθ).

If Q=$B_1 \land \ldots \land B_k$ is a query and Qθ is ground, then define score (Qθ)=$\Pi_{i=1}^n$score(B,θ). In other words, conjunctive queries are scored by combining the scores of literals as if they were independent probabilities.

Recall that the answer to a conventional conjunctive query is the set of ground substitutions that make the query "true", i.e., provable against the EDB. In WHIRL, the notion of provability has been replaced with the "soft" notion of score: substitutions with a high score are intended to be better answers than those with a low score. It seems reasonable to assume that users will be most interested in seeing the high-scoring substitutions, and will be less interested in the low-scoring substitutions. This is formalized as follows: Given an EDB, the "full answer set" $S_Q$ for a conjunctive query Q is defined to be the set of all θ such that Qθ is ground and has a non-zero score. An r-answer $R_Q$ for a conjunctive query Q is defined to be an ordered list of substitutions from the full answer set such that:

for all $θ_i ∈ R_Q$ and σ ∈ $S_Q$—$R_Q$; score (Qθ$_i$)≧score(Qσ); and for all $θ_{ij}$ $θ_j$ ∈ $R_Q$ where i<j, score (Qθ$_i$)≧score(Qθj).

In other words, $R_Q$ contains r highest-scoring substitutions, ordered by non-increasing score.

It is assumed that the output of a query-answering algorithm given the query Q will not be a full answer set, but rather an r-answer for Q, where r is a parameter fixed by the user. To understand the notion of an r-answer, observe that in typical situations the full answer set for WHIRL queries will be very large. For example, the full answer set for the query $Q_1$, given as an example above would include all pairs of company names Company1, Company2 that both contain the term "Inc." This set might be very large. Indeed, if it is assumed that a fixed fraction $$\frac{1}{k}$$

of company names contain the term "Inc.", and that R and S each contain a random selection of n company names, then one would expect the size of the full answer set to contain $$\left(\frac{n}{k}\right)^2$$

substitutions simply due to the matches on the term "Inc." Further, the full answer set for the join of m relations of this sort would be of size at least $$\left(\frac{n}{k}\right)^m.$$

To further illustrate this point, I computed the pairwise similarities of two lists R and S of company names with R containing 1163 names, S containing 976 names. These lists are the relations Hoovers Web 301 and Iontech 302 shown in FIG. 3. Although the intersection of R and S appears to contain only about 112 companies, over 314,000 name pairs had non-zero similarity. In this case, the number of non-zero similarities can be greatly reduced by discarding a few very frequent terms like "Inc." However, even after this preprocessing, there are more than 19,000 non-zero pairwise similarities,which is more than 170 times the number of correct pairings. This is due to a large number of moderately frequently terms (like "American" and "Airlines") that cannot be safely discarded. Thus, it is in general impractical to compute full answer sets for complex queries and present them to a user. This leads to the assumption of an r-answer, which advantageously simplifies the results provided in accordance with the present invention.

The scoring scheme given above for conjunctive queries can be fairly easily extended to certain more expressive languages in accordance with the present invention. Below, I consider such an extension, which corresponds to projections of unions of conjunctive queries.

A "basic WHIRL clause" is written $p(X_1, \ldots, X_k) \leftarrow Q$, where Q is a conjunctive WHIRL query that contains all of the $X_i$'s. A "basic WHIRL view υ" is a set of basic WHIRL clauses with heads that have the same predicate symbol p and arity k. Notice that by this definition, all the literals in a clause body are either EDB literals or similarity literals. In other words, the view is flat, involving only extensionally defined predicates.

Now, consider a ground instance a=$p(x_1, \ldots, x_k)$ of the head of some view clause. The "support of a" (relative to the view υ and a given EDB) is defined to be the following set of triples:

support (a)={(A←Q,θ,5): (A←Q) ∈ υ and Aθ=a and score (Qθ)=s and s>0} The score of $(x_1, \ldots, x_k)$ in p is defined as follows:

$$\text{score}((x_1, \ldots, x_k) \in p) = 1 - \prod_{(C,\Theta,s) \in support(p(x_1,\ldots,x_k))} (1-s) \quad \text{Equation (1)}$$

To understand this formula, note that it is some sense a dual of multiplication: if $e_1$ and $e_2$ are independent probabilistic events with probability $p_1$ and $p_2$ respectively, then the probability of ($e_1 \land e_2$) is $p_1 \cdot p_2$, and the probability of ($e_1 \lor e_2$) is $1-(1-p_1)(1-p_2)$. The "materialization of the view υ" is defined to be a relation with name p which contains all tuples $(x_1, \ldots, x_k)$ such that score($(x_1, \ldots, x_k)$ ∈ p)>0).

Unfortunately, while this definition is natural, there is a difficulty with using it in practice. In a conventional setting, it is easy to materialize a view of this sort, given a mechanism for solving a conjunctive query. In WHIRL, one would prefer to assume only a mechanism for computing r-answers to conjunctive queries. However, since Equation (1) involves a support set of unbounded size, it appears that r-answers are not enough to even score a single ground instance a.

Fortunately, however, low-scoring substitutions have only a minimal impact on the score of a. Specifically, if (C,θ,s) is such that s is close to zero, then the corresponding factor of (1−s) in the score for a is close to one. One can thus approximate the score of Equation (1) using a smaller set of high-scoring substitutions, such as those found in an r-answer for moderately large r.

In particular, let $\upsilon$ contain the clauses $A_1 \leftarrow Q_1, \ldots, A_n \leftarrow Q_n$, let $R_{Q1}, \ldots, R_{Qn}$ be r-answers for the $Q_i$'s, and let $R=U_i R_{Qi}$. Now define the "r-support for a from R" to be the set:

$\{(A \leftarrow Q,\theta,s): (A \leftarrow Q,\theta,s) \in \text{support}(a) \text{ and } \theta \in R\}$ Also define the r-score for a from R by replacing support (a) in Equation (1) with the r-support set for a. Finally, define the "r-materialization of $\upsilon$ from R" to contain all tuples with non-zero r-score, with the score of $x_1, \ldots, x_k$ in p being its r-score from R.

Clearly, the r-materialization of a view can be constructed using only an r-answer for each clause body involved in the view. As r is increased, the r-answers will include more and more high-scoring substitutions, and the r-materialization will become a better and better approximation to the full materialized view. Thus, given an efficient mechanism for computing r-answers for conjunctive views, one can efficiently approximate the answers to more complex queries.

One embodiment of WHIRL implements the operations of finding the r-answer to a query and the r-materialization of a view. As noted above, r-materialization of a view can be implemented easily given a routine for constructing r-answers. First, however, I will give a short overview of the main ideas used in the process.

In an embodiment of WHIRL, finding an r-answer is viewed as an optimization problem. In particular, the query processing algorithm uses a general method called A* search to find the highest-scoring r substitutions for a query. The A* search method is described in *Principles of Artificial Intelligence*, by Nils Nilsson, Morgan Kaufmann, 1987. Viewing query processing as search is natural, given that the goal is to find a small number of good substitutions, rather than all satisfying substitutions. The search method of one embodiment also generalizes certain techniques used in IR ranked retrieval. However, using search in query processing is unusual for database systems, which more typically use search only in optimizing a query.

To understand the use of search, consider finding an r-answer to the WHIRL query insiderTip(X) $\wedge$ publiclyTraded(Y) $\wedge$ X~Y, where the relation publiclyTraded is very large, but the relation insiderTip is very small. In processing the corresponding equijoin insiderTip (X) $\wedge$ publiclyTraded(Y) $\wedge$ X=Y with a known database system, one would first construct a query plan. For example, one might first find all bindings for X, and then use an index to find all values Y in the first column of publiclyTraded that are equivalent to some X. It is tempting to extend such a query plan to WHIRL, by simply changing the second step to find all values Y that are similar to some X. However, this natural extension can be quite inefficient. Imagine that insiderTip contains the vector $x_i$, corresponding to the document "Armadillos, Inc." Due to the frequent occurrence of the term "Inc.", there will be many documents Y that have non-zero similarity to $x_1$, and it will be expensive to retrieve all of these documents Y and compute their similarity to $x_1$. One way of avoiding this expense is to start by retrieving a small number of documents Y that are likely to be highly similar to $x_1$. In this case, one might use an index to find all Y's that contain the rare term "Armadillos." Since "Armadillos" is rare, this step will be inexpensive, and the Y's retrieved in this step must be somewhat similar to $x_1$. Recall that the weight of a term depends inversely on its frequency, so rare terms have high weight, and hence these Y's will share at least one high-weight term with X. Conversely, any Y's not retrieved in this step must be somewhat dissimilar to $X_1$, since such a Y cannot share with the high-weight term "Armadillos." This suggests that if r is small, and an appropriate pruning method is used, a subtask like "find the r documents Y that are most similar to $x_1$" might be accomplished efficiently by the subplan of "find all Y's containing the term 'Armadillos'." Of course, this subplan depends on the vector $x_1$.

To find the Y's most similar to the document "The American Software Company" (in which every term is somewhat frequent), a very different type of subplan might be required. The observations suggest that query processing should proceed in small steps, and that these steps should be scheduled dynamically, in a manner that depends on the specific document vectors being processed.

The query processing method described below searches through a space of partial substitutions. Each substitution is a list of values that could be assigned to some, but not necessarily all, of the values appearing in the query. For example, one state in the search space for the query given above would correspond to the substitution that maps X to $x_1$ and leaves Y unbound. Each state in the search space is a "partial list" of possible variable bindings. As used herein, a "partial list" (possible variable bindings) can include bindings to all variables in the query, or bindings to some subset of those variables, including the empty set. The steps taken through this search space are small ones, as suggested by the discussion above. For instance, one operation is to select a single term t and use an inverted index to find plausible bindings for a single unbound variable. Finally, the search algorithm orders these operations dynamically, focusing on those partial substitutions that seem to be most promising, and effectively pruning partial substitutions that cannot lead to a high scoring ground substitution.

A* search is a graph search method which attempts to find the highest scoring path between a given start state so and a goal state. A pseudo-code embodiment of A* search as used in an embodiment of the present invention is as follows:

```
procedure A* (r s₀, goalState (.), children(.))
Begin
    OPEN = {s₀}
    while (OPEN ≠ ∅) do
        s:=argmax, ∈OPEN ʰ(s')
        OPEN: = OPEN − {s}
        If goalState(s) then
            output (s, h (s)}
            Exit if r answers printed
        else
            OPEN: = OPEN U children(s)
```

-continued

```
        endif
    endwhile
end
Initial state s_0: {Ø, Ø}
goalState ((Ø, E)): true iff Q Ø is ground
children ((Ø, E)):
    if constrain ((Ø, E)) ≠Ø then return constrain ((Ø, E))
    else return explode ((Ø, E))
constrain ((Ø, E)):
    1. pick X, Y, t where
        Xθ = x,
        Y is unbound in θ with generator p and generation index l (see text)
        x^t – maxweight (t, p, l) is maximal over all such X, Y, t combinations
    2. If no such X, Y, t exists then return Ø
    3. return {(Ø, E'): U {(Ø_1, E), . . . , (Ø_n, E)}
        where E'= E U {t, Y)}, and
        each θ_i is θ U {Y_1 = v_1, . . . , Y_k = v_k} for some (v_1, . . . v_k) ∈ index (t, p, l) and
        θ_1 is E-valid.
explode ((Ø, E)):
    pick p (Y_1, . . . , Y_k) such all Y_i's are unbound by θ
    return the set of all (θ U {Y_1 _v_1, . . . , Y_k = v_k}, E)
    such that (v_i, . . . , v_k) ∈ tuples (p) and θ U {Y_1 = v_1, . . . , Y_k = v_k} is E-valid.
h ((θ, E)): π_{(i-1)}^{h'} (B_i, θ) where
    h'(B_i θ) = score (B_i θ) for ground B_i θ
    h'((X ~ Y) θ) =
        Σ_{T∈T}: (T, Y)gE^{axt.maxweight}(t, p, l)
    where X θ = x, Y is unbound index l (see text)
    generator p and generation index l (see text)
```

As can be seen in the above pseudo-code, goal states are defined by a goalState predicate. The graph being searched is defined by a function children(s), which returns the set of states directly reachable from state s. To conduct the search, the A* algorithm maintains a set OPEN of states that might lie on a path to some goal state. Initially OPEN contains only the start state $s_0$.

At each subsequent step of the algorithm, a single state is removed from the OPEN set; in particular, the state s that is "best" according to a heuristic function, h(s), is removed from OPEN. If s is a goal state, then this state is output; otherwise, all children of s are added to the OPEN set. The search continues until r goal states have been output, or the search space is exhausted.

I will now explain how this general search method has been instantiated in WHIRL in accordance with an embodiment of the present invention. I will assume that in the query Q, each variable in Q appears exactly once in a EDB literal. In other words, the variables in EDB literals are distinct from each other, and also distinct from variables appearing in other EDB literals, and both variables appearing in a similarity literal also appear in some EDB literal. (This restriction is made innocuous by an additional predicate eq(X,Y) which is true when X and Y are bound to the same document vector. The implementation of the eq predicate is straight forward and known in the art, and will be ignored in the discussion below.) In processing queries, the following data structures will be used. An inverted index will map terms t ∈ T to the tuples that contain them: specifically, I assume a function index (t,p,i) which returns the set of tuples $(v_1, \ldots, v_i, \ldots, v_k)$ in tuples(p) such that $v_i^t > 0$. This index can be evaluated in linear time (using an appropriate data structure) and precomputed in linear time from the EDB. I also precompute the function maxweight (t,p,i), which returns the maximum value of $v_i^t$ over all documents $v_i$ in the i-th column of p. Inverted indices are commonly used in the field on information retrieval, and means of storing and accessing them efficiently are well known to those skilled in the art of information retrieval. The max weight function is also used in many known techniques for speeding up processing of ranked retrieval queries, such as those described in Turtle and Flood.

The states of the graph searched will be pairs (θ,E), where θ is a substitution, and E is a set of exclusions. Goal states will be those for which θ is ground for Q, and the initial state $s_0$ is (0,0). An exclusion is a pair (t,Y) where t is a term and Y is a variable. Intuitively, it means that the variable Y must not be bound to a document containing the term t. Formally, I say that a substitution θ is E-valid in ∀(t,Y) ∈ E, (Yθ)^t=0. Below I define the children function so that all descendants of a node <s,E> must be E-valid; making appropriate use of these exclusions will force the graph defined by the children function to be a tree.

I will adopt the following terminology. Given a substitution θ and query Q, a similarity literal X~Y is constraining if and only if exactly one of Xθ and Yθ are ground. Without loss of generality, I assume that Xθ is ground and Yθ is not. For any variable Y, the EDB literal of Q that contains Y is the generator for Y, the position l of Y within this literal is Y's generation index. For well-formed queries, there will be only one generator for a variable Y.

Children are generated in two ways: by exploding a state, or by constraining a state. Exploding a state corresponds to picking all possible bindings of some unbound EDB literal. To explode a state s=<θ,E>, pick some EDB literal $p(Y_1, \ldots, Y_k)$ such that all the $Y_i$'s are unbound by θ, and then construct all states of the form $(θ \cup \{Y_1=v_1, \ldots, Y_k=v_k\}, E)$ such that $(v_1, \ldots, v_k) \in$ tuples(p) and $θ \cup \{Y_1=v_1, \ldots, Y_k=v_k\}$ is E-valid. These are the children of s.

The second operation of constraining a state implements a sort of sideways information passing. To constrain a state s=<θ,E>, pick some constraining literal X~Y and some term t with non-zero weight in the document Xθ such that <t,Y>∉E. Let $p(Y_1, \ldots, Y_k)$ be the generator for the (unbound) variable Y, and let l be Y's generation index. Two sets of child states will now be constructed. The first is a singleton set containing the state s'=<θ,E'>, where E'=E∪{<t,Y>}. Notice that by further constraining s', other constraining literals and other terms t in Xθ can be used to generate plausible variable bindings. The second set $S_t$ contains all states $\langle\theta_i, E\rangle$ such that $\theta_i = \theta \cup \{Y_1 = v_1, \ldots, Y_k = v_k\}$ for some $\langle v_1, \ldots, v_k\rangle \in \text{index}(t,p,l)$ and $\theta$ is E-valid. The states in $S_t$ thus correspond to binding Y to some vector containing the term t. The set children(s) is $S_t \cup \{s'\}$.

It is easy to see that if $s_i$ and $s_j$ are two different states in $S_t$, then their descendants must be disjoint. Furthermore, the descendants of s' must be disjoint from the descendants of any $s_i \in S_t$, since all descendants of s' are valid for E', and none of the descendants of $s_i$ can be valid for E'. Thus the graph generated by this children function is a tree.

Given the operations above, there will typically be many ways to "constrain" or "explode" a state. In the current implementation of WHIRL, a state is always constrained using the pair $\langle t, Y\rangle$, such that $x^r$.maxweight(t,p, ) is maximal, where p and l are the generator and generation index for Y. States are exploded only if there are no constraining literals, and then always exploded using the EDB relation containing the fewest tuples.

It remains to define the heuristic function, which, when evaluated, produces a heuristic value. Recall that the heuristic function $h(\theta, E)$ must be admissible, and must coincide with the scoring function $(Q\theta)$ on ground substitutions. This implies that $h(\theta, E)$ must be an upper bound on score(q) for any ground instance q of $Q\theta$. I thus define $h(\theta, E)$ to be $\Pi_{i=1}^{k} h^{-1}(B_i, \Theta, E)$, where h' will be an appropriate upper bound on score $(B_i\theta)$. I will let this bound equal score $(B_i\theta)$ for ground $(B_i\theta)$, and let it equal 1 for non-ground $B_i$, with the exception of constraining literals. For constraining literals, h'(*) is defined as follows:

$$\sum_{t \in T: (t,Y) \notin E}$$

where p and l are the generator and generation index for Y. Note that this is an upper bound on the score of $B_i\sigma$ relative to any ground superset a of $\theta$ that is E-valid.

In the current implementation of WHIRL, the terms of a document are stems produced by the Porter stemming algorithm. The Porter stemming algorithm is described in "An Algorithm for Suffix Stripping", by M. F. Porter, Program, 14(3):130–137, 1980. In general, the term weights for a document $v_i$ are computed relative to the collection C of all documents appearing in the i-th column of p. However, the TF-IDF weighting scheme does not provide sensible weights for relations that contain only a single tuple. (These relations are used as a means of introducing "constant" documents into a query.) Therefore weights for these relations must be calculated as if they belonged to some other collection C'.

To set these weights, every query is checked before invoking the query algorithm to see if it contains any EDB literals $p(X_1, \ldots, X_k)$ for a singleton relation p. If one is found, the weights for the document $x_i$ to which a variable $X_i$ will be are computed using the collection of documents found in the column corresponding to $Y_i$, where $Y_i$ is some variable that appears in a similarity literal with $X_i$. If several such $Y_i$'s are found, one is chosen arbitrarily. If $X_i$ does not appear in any similarity literals, then its weights are irrelevant to the computation.

The current implementation of WHIRL keeps all indices and document vectors in main memory.

In the following examples of the procedure in accordance with the present invention, it is assumed that terms are words.

Consider the query "const1(IO) ∧ p(Company, Industry) ∧ Industry~IO", where const1 contains the single document "telecommunications services and/or equipment".

With $\theta=0$, there are no constraining literals, so the first step in answering this query will be to explode the smallest relation, in this case constl. This will produce one child, $s_1$, containing the appropriate binding for IO, which will be placed on the OPEN list.

Next $s_1$ will be removed from the OPEN list. Since Industry~IO is now a constraining literal, a term from the bound variable IO will be picked, probably the relatively rare stem "telecommunications". The inverted index will be used to find all tuples $\langle co_1 ind_1\rangle, \ldots, \langle co_n ind_n\rangle$ such that $ind_1$ contains the term "telecommunications", and n child substitutions that map Company=$co_i$ and Industry=$ind_i$ will be constructed. Since these substitutions are ground, they will be given h(*) values equal to their actual scores when placed on the OPEN list. A new state $s'_1$ containing the exclusion (telecommunications,Industry) will also be placed on the OPEN list. Note that $h(s'_1) < h(s_1)$, since the best possible score for the constraining literal Industry~IO can match at most only four terms: "services" "and", "or", "equipment", all of which are relatively frequent, and hence have low weight.

Next, a state will again be removed from the OPEN list. It may be that $h(s'_1)$ is less than the h(*) value of the best goal state; in this case, a ground substitution will be removed from OPEN, and an answer will be output. Or it may be that $h(s'_1)$ is higher than the best goal state, in which case it will be removed and a new term, perhaps equipment", will be used to generate some additional ground substitutions. These will be added to the OPEN list, along with a state which has large exclusion set and thus a lower value.

This process will continue until documents are generated. Note that it is quite likely that low weight terms such as "or" will not be used at all.

In another example of the present invention, consider the query p(Company1,Industry) ∧ q(Company2, WebSite)

∧ Company1~Company2

In solving this query, the first step will be to explode the smaller of these relations. Assume that this is p, and that p contains 1000 tuples. This will add 1000 states $s_1, \ldots, s_{1000}$ to the OPEN list. In each of these states, Company1 and Industry are bound, and Company1~Company2 is a constraining literal. Thus each of these 1000 states is analogous to the state $s_1$ in the preceding example.

However, the h(*) values for the states $s_1, \ldots, s_{1000}$ will not be equal. The value of the state $s_1$ associated with the substitution $\theta_i$ will depend on the maximum possible score for the literal Company1~Company2, and this will be large only if the high-weight terms in the document Company1$\theta_i$ appear in the company field of q. As an example, a one-word document like "3Com" will have a high h(*) value if that term appears (infrequently) in the company field of q, and a zero h(*) value if it does not appear; similarly, a document like "Agents, Inc" will have a low h(*) value if the term "agents" does not appear in the first column of q.

The result is that the next step of the algorithm will be to choose a promising state from the OPEN list, a state that could result in an good final score. A term from the Company1 document in $s_1$, e.g., "3Com", will then be picked and used to generate bindings for Company2 and WebSite. If any of these bindings results in perfect match, then an answer can be generated on the next iteration of the algorithm.

In short, the operation of WHIRL is somewhat similar to time-sharing 1000 simpler queries on a machine for which the basic unit of computation is to access a single inverted index. However, WHIRL's use of the h(*) function will schedule the computation of these queries in an intelligent way: queries unlikely to produce good answers can be discarded, and low-weight terms are unlikely to be used.

In yet another example, consider the query p(Company1, Industry) ∧ q(Company2,WebSite) ∧ Company1~Company2 ∧ const1(I0) ∧ Industry~I0, where the relation const1 contains the single document, "telecommunications and/or equipment". In solving this query, WHIRL will first explode const1 and generate a binding for I0. The literal Industry~I0 then becomes constraining, so it will be used to pick bindings for Company1 and Industry using some high-weight term, perhaps "telecommunications".

At this point there will be two types of states on the OPEN list. There will be one state s' in which only I0 is bound, and (telecommunications,Industry) is excluded. There will also be several states $S_1, \ldots, S_n$ in which I0, Company1 and Industry are bound; in these states, the literal Company1~Company2 is constraining. If s' has a higher score than any $s_i$, then s' will be removed from the OPEN list, and another term from the literal Industry~I0 will be used to generate additional variable bindings.

However, if some $s_i$ literal has a high h(*) value, then it will be taken ahead of s'. Note that this possible when the bindings in $s_i$ lead to a good actual similarity score for Industry~I0 as well as a good potential similarity score for Company1~Company2 (as measured by the h'(*) function). If an $s_i$ is picked, then bindings for Company 2 and WebSite will be produced, resulting a ground state. This ground state will be removed from the OPEN list on the next iteration only if its h(*) value is higher that of s' and all of the remaining $s_i$.

This example illustrates how bindings can be propagated through similarity literals. The binding for I0 is first used to generate bindings for Company1 and Industry, and then the binding for Company1 is used to bind Company2 and Website. Note that bindings are generated using high-weight, low-frequency terms first, and low-weight, high-frequency terms only when necessary.

Embodiments of the invention have been evaluated on data collected from a number of sites on the World Wide Web. I have evaluated the run-time performance with CPU time measurements on a specific class of queries, which I will henceforth call similarity joins. A similarity join is a query of the form $p(X_1, \ldots, X_i, \ldots, X_k) \wedge q(Y_1, \ldots, Y_j, \ldots, Y_b) \wedge X_i \sim Y_j$ An answer to this query will consist of the r tuples from p and q such that $X_i$ and $Y_j$ are most similar. WHIRL was compared on queries of this sort to the following known algorithms:

1) The naive method for similarity joins takes each document in the i-th column of relation p in turn, and submits it as a IR ranked retrieval query to a corpus corresponding to the j-column of relation q. The top r results from each of these IR queries are then merged to find the best r pairs overall. This might be more appropriately be called a "semi-naive" method; on each IR query, I use inverted indices, but I employ no special query optimizations.

2) WHIRL is closely related to the maxscore optimization, which is described in *Query Evaluation: Strategies and Optimizations* by Howard Turtle and James Flood, in Information Processing and Management, 31(6):831–850, November 1995. WHIRL was compared to a maxscore method for similarity joins; this method is analogous to the naive method described above, except that the maxscore optimization is used in finding the best r results from each "primitive" query.

I computed the top 10 answers for the similarity join of subsets of the IMDB 303 and VideoFlicks 304 relations show in FIG. 3. In particular, I joined size n subsets of both relations, for various values of n between 2000 and 30,000. WHIRL speeds up the maxscore method by a factor of between 4 and 9, and speeds up the naive method by a factor of 20 or more. The absolute time required to compute the join is fairly modest. With n=30,000, WHIRL takes well under than a minute to pick the best 10 answers from the 900 million possible candidates.

To evaluate the accuracy of the answers produced by WHIRL, I adopted the following methodology. Again focusing on similarity joins, I selected pairs of relations which contained two or more plausible "key" fields. One of these fields, the "primary key", was used in the similarity literal in the join. The second key field was then used to check the correctness of proposed pairings; specifically, a pairing was marked as "correct" if the secondary keys matched (using an appropriate matching procedure) and "incorrect" otherwise.

I then treated "correct" pairings in the same way that "relevant" documents are typically treated in evaluation of a ranking proposed by a standard IR system. In particular, I measured the quality of a ranking using non-interpolated average precision. To motivate this measurement, assume the end user will scan down the list of answers and stop at some particular target answer that he or she finds to be of interest. The answers listed below this "target" are not relevant, since they are not examined by the user. Above the target, one would like to have a high density of correct pairings; specifically, one would like the set S of answers above the target to have high precision, where the precision of S is the ratio of the number of correct answers in S to the number of total answers in S. Average precision is the average precision for all "plausible" target answers, where an answer is considered a plausible target only if it is correct. To summarize, letting $a_k$ be the number of correct answers in the first k, and letting c(k)=1 iff the k-th answer is correct and letting c(k)=0 otherwise, average precision is the quantity $\Sigma_{k=1}^{r} c(k) \cdot a_k/k$. I used three pairs of relations from three different domains. In the business domain, I joined Iontech 301 and Hoovers Web 302, using company name as the primary key, and the string representing the "site" portion of the home page as a secondary key. In the movie domain, I joined Review 305 and MovieLink 306 (FIG. 3), using film names as a primary key. As a secondary key, I used a special key constructed by the hand-coded normalization procedure for film names that is used in IM, an implemented heterogeneous data integration system described in *Querying Heterogeneous Information Sources Using Source Descriptions* by Alon Y. Levy, Anand Rajaraman, and Joann J. Ordille, Proceedings of the 22nd International Conference on Very Large Databases (VLDB-96), Bombay, India, September 1996. In the animal domain, I joined Animal1 307 and Animal2 308 (FIG. 3), using common names as the primary key, and scientific names as a secondary key (and a hand-coded domain-specific matching procedure).

On these domains, similarity joins are extremely accurate. In the movie domain, the performance is actually identical to the hand-coded normalization procedure, and thus has an average precision of 100%. In the animal domain, the average precision is 92.1%, and in the business domain, average precision is 84.6%. These results contrast with the typical performance of statistical IR systems on retrieval problems, where the average precision of a state-of-the art IR system is usually closer to 50% than 90%. In other words, the tested embodiment of the present invention was able to achieve results in an efficient, automatic fashion that were just as good as the results obtained using a substantially more expensive technique involving hand-coding, i.e., human intervention.

The foregoing has disclosed to those skilled in the arts of information retrieval and database how to integrate information from many heterogeneous sources using the method of the invention. While the techniques disclosed herein are the best presently known to the inventor, other techniques could be employed without departing from the spirit and scope of the invention. For example, representations other than relational representations are used to store data; some of these representations are described in *Proceedings of the Workshop on Management of Semistructured Data*, edited by Dan Suciu, available from http://www.research.att.com/~suciu/workshop-papers.html. Many of these representations also employ constant values as keys, and could be naturally extended to use instead textual values that are associated with each other based on similarity metrics.

In the process of finding answers with high score, the invention employs A* search. Many variants of this search algorithm are known and many of these could be used. The current invention also outputs answer tuples in an order that is strictly dictated by score; some variants of A* search are known that require less compute time, but output answers in an order that is largely, but not completely, consistent with this ordering.

Methods are also known for finding pairs of similar keys by using Monte Carlo sampling methods; these methods are described in *Approximating Matrix Multiplication for Pattern Recognition Tasks*, in Eighth Annual ACM-SIAM Symposium on Discrete Algorithms, pages 682–691, 1997. For certain types of queries, these sampling methods could be used instead of, or as a supplement to, some variant of A* search.

Many different term-based similarity functions have been proposed by researchers in information retrieval. Many of these variants could be employed instead of the function employed in the invention.

Finally, while the problem that motivated the development of this invention is integration of data from heterogeneous databases, there are potentially other problems to which the present invention can be advantageously applied. That being the case, the description of the present invention set forth herein is to be understood as being in all respects illustrative and exemplary, but not restrictive.

What is claimed is:

1. A method for answering a query containing a join operation, the method comprising:
   representing each entry in a column of a first relation by a vector;
   representing each entry in a column of a second relation by a vector;
   selecting a subset of rows of the first relation;
   for each of the entries in the column of the first relation that is part of a row from the subset of rows:
   determining the value of a similarity metric function that is based upon the vector representing the entry in the column of the first relation and a vector representing an entry from the column of the second relation, for each entry in the column of the second relation;
   joining the first relation with the second relation based upon the set of similarty metric function values determined; and
   outputting the result of the joining.

2. A method for answering a query containing a join operation, the method comprising:
   representing each entry in a field of a first relation by a vector;
   representing each entry in a field of a second relation by a vector;
   selecting a subset of tuples of the first relation;
   for each of the entries in the field of the first relation that is part of a tuple from the subset of tuples:
   determining the value of a similarity metric function that is based upon the vector representing the entry in the field of the first relation and a vector representing an entry from the field of the second relation, for each entry in the field of the second relation;
   joining the first relation with the second relation based upon the set of similarity metric function values determined; and
   outputting the result of the joining.

3. The method of claim 2 wherein the joining is based on the N highest values in a subset of the set of similarity metric function values determined, where N is an integer.

4. The method of claim 2 wherein the joining is based on the N lowest values in a subset of the set of similarity metric function values determined, where N is an integer.

5. The method of claim 2 wherein an estimate of probability for correct matching of each tuple of the result is additionally output.

6. The method of claim 5 wherein the estimate of probability for a tuple is based on the value of the similarity metric function associated with that tuple.

7. The method of claim 2 wherein the first relation and the second relation are heterogeneous relations that are maintained separately and in locations remote to one another.

8. The method of claim 2 wherein each component of each vector corresponds to at least one of the following terms in the corresponding entry: a word, a word prefix, a word suffix, and a phrase.

9. The method of claim 8 wherein the value of each component of each vector is based on the frequency of the term corresponding to the component in the entry corresponding to the vector.

10. The method of claim 9 wherein the value of a component of each vector is additionally based on the frequency of occurrence of the term corresponding to the component, in all of the entries in a field including the vector.

11. The method of claim 2 wherein each vector is normalized to unit length.

12. The method of claim 2 wherein the similarity metric function is given by $$\sum_i v^i \cdot w^i$$

wherein $v^i$ is the $i^{th}$ component of a vector v corresponding to an entry in the field from the first relation, and $w^i$ is the $i^{th}$ component of vector w corresponding to an entry in the field from the second relation.

13. The method of claim 2 wherein the query is probabilistically answered using the A* search algorithm.

14. A medium storing instructions for answering a query containing a join operation, the instructions adapted to be executed by a processor, the instructions including:
   representing each entry in a field of a first relation by a vector;
   representing each entry in a field of a second relation by a vector;

selecting a subset of tuples of the first relation;

for each of the entries in the field of the first relation that is part of a tuple from the subset of tuples:

determining the value of a similarity metric function that is based upon the vector representing the entry in the field of the first relation and a vector representing an entry from the field of the second relation, for each entry in the field of the second relation;

joining the first relation with the second relation based upon the set of similarity metric function values determined; and outputting the result of the joining.

15. The medium 14 wherein the joining is based on the N highest values in a subset of the set of similarity metric function values determined, where N is an integer.

16. The medium of claim 14 wherein the joining is based on the N lowest values in a subset of the set of similarity metric function values determined, where N is an integer.

17. The medium of claim 14 wherein an estimate of probability for correct matching of each tuple of the result is additionally output.

18. The medium of claim 17 wherein the estimate of probability for a tuple is based on the value of the similarity metric function associated with that tuple.

19. The medium of claim 14 wherein the first relation and the second relation are heterogeneous relations that are maintained separately and in locations remote to one another.

20. The medium of claim 14 wherein each component of each vector corresponds to at least one of the following terms in the corresponding entry: a word, a word prefix, a word suffix, and a phrase.

21. The medium of claim 14 wherein the value of each component of each vector is based on the frequency of the term corresponding to the component in the entry corresponding to the vector.

22. The medium of claim 21 wherein the value of a component of each vector is additionally based on the frequency of occurrence of the term corresponding to the component, in all of the entries in a field including the vector.

23. The medium of claim 14 wherein each vector is normalized to unit length.

24. The medium of claim 14 wherein the similarity metric function is given by $$\sum_i v^i \cdot w^i$$

wherein $v^i$ is the $i^{th}$ component of a vector v corresponding to an entry in the field from the first relation, and $w^i$ is the $i^{th}$ component of vector w corresponding to an entry in the field from the second relation.

25. The medium of claim 14 wherein the query is probabilistically answered using the A* search algorithm.

26. An apparatus for answering a query containing a join operation, the apparatus comprising:

a processor; and a memory that stores instructions adapted to be executed by a processor, the instructions including:

representing each entry in a field of a first relation by a vector;

representing each entry in a field of a second relation by a vector;

selecting a subset of tuples of the first relation;

for each of the entries in the field of the first relation that is part of a tuple from the subset of tuples;

determining the value of a similarity metric function that is based upon the vector representing the entry in the field of the first relation and a vector representing an entry from the field of the second relation, for each entry in the field of the second relation;

joining the first relation with the second relation based upon the set of similarity metric function values determined; and outputting the result of the joining.

27. A method for performing a join operation, the method comprising the steps of:

representing each entry in a field of a first relation and a field of a second relation as a vector;

evaluating a similarity metric function on a plurality of pairs of vectors, wherein each pair from the plurality of pairs of vectors includes a vector from the field of the first relation and a vector from the field of the second relation;

determining whether to join a tuple from the first relation and a tuple from the second relation based on i) the value of the similarity function evaluated on the vector corresponding to the entry that is in the tuple from the first relation and the field of the first relation, and the vector corresponding to the entry that is in the tuple from the second relation and the field of the second relation; and ii) the values for the similarity metric function obtained in the evaluation step; and outputting the tuple obtained by joining the tuple from the first relation and the tuple from the second relation.

28. The method of claim 27 wherein a probability estimate for correct joining of the tuple from the first relation and the tuple from the second relation is also output, wherein the probability estimate is based on the value of the similarity function evaluated on the vector corresponding to the entry that is in the tuple from the first relation and the field of the first relation, and the vector corresponding to the entry that is in the tuple from the second relation and the field of the second relation.

* * * * *

UNITED STATES PATENT AND TRADEMARK OFFICE
CERTIFICATE OF CORRECTION

PATENT NO.   : 6,295,533 B2
DATED        : September 25, 2001
INVENTOR(S)  : William W. Cohen It is certified that error appears in the above-identified patent and that said Letters Patent is hereby corrected as shown below:

<u>Column 19,</u>
Line 63, change "similanty" to -- similarity --.

Signed and Sealed this

Nineteenth Day of March, 2002

Attest:

Attesting Officer

JAMES E. ROGAN
Director of the United States Patent and Trademark Office